US012684314B1

(12) United States Patent (10) Patent No.: US 12,684,314 B1

Hunt (45) Date of Patent: Jul. 14, 2026

(54) TRACKING BRACELET

(71) Applicant: Vonecia Hunt, Snellville, GA (US)

(72) Inventor: Vonecia Hunt, Snellville, GA (US)

(*) Notice: Subject to any disclaimer, the term of this patent is extended or adjusted under 35 U.S.C. 154(b) by 295 days.

(21) Appl. No.: 18/617,397

(22) Filed: Mar. 26, 2024

Related U.S. Application Data

(60) Provisional application No. 63/454,832, filed on Mar. 27, 2023.

(51) Int. Cl.
| | |
|---|---|
| *A01K 11/00* | (2006.01) |
| *A01K 15/02* | (2006.01) |
| *A01K 27/00* | (2006.01) |
| *A01K 29/00* | (2006.01) |
| *G06Q 40/00* | (2023.01) |
| *G06Q 40/02* | (2023.01) |
| *G08B 21/02* | (2006.01) |
| *G08B 23/00* | (2006.01) |
| *G08C 17/02* | (2006.01) |
| *H04W 4/02* | (2018.01) |
| *H04W 4/029* | (2018.01) |
| *H04W 64/00* | (2009.01) |

(52) U.S. Cl.
CPC ........... *H04W 4/029* (2018.02); *A01K 11/008* (2013.01); *A01K 27/009* (2013.01); *A01K 29/005* (2013.01); *G08B 21/0208* (2013.01); *G08B 21/0211* (2013.01); *G08B 21/0269* (2013.01); *G08B 21/0286* (2013.01); *G08C 17/02* (2013.01)

(58) Field of Classification Search
None
See application file for complete search history.

(56) References Cited

U.S. PATENT DOCUMENTS

| | | | |
|---|---|---|---|
| 5,652,570 A | 7/1997 | Lepkofker | |
| 7,602,302 B2 * | 10/2009 | Hokuf | G08B 21/0277 |
| | | | 340/573.2 |
| 8,254,868 B2 * | 8/2012 | Constien | H04W 52/0258 |
| | | | 455/343.1 |
| 8,258,748 B2 * | 9/2012 | Constien | G06F 1/3203 |
| | | | 320/132 |
| 9,361,783 B2 | 6/2016 | Harvey | |

(Continued)

OTHER PUBLICATIONS

4G Waterproof Tracker Kids Smart Watch Camera Anti-Lost SOS Call for IOS Android. Product Listing [online] Copyright © 1995-2024 eBay Inc. [retrieved on Mar. 26, 2024]. Retrieved from the Internet: <URL: https://www.ebay.com/itm/155476653910?itmmeta= 01HSY7FAXA15E7G0X0RTZF57W6&hash= item2433217756:g:sPcAAOSwB2Nk16gA&itmprp=enc% 3AAQAJAAABIBd%2FSoZdnO%2FU4vPLRG8MfqD8WPp% 2FIO3IFICA5vg%2BVX8RYdEyUOWdUlyap8TMqSKez1uugQm rP6LHVTIIRgFtLbqGIWNXGzig0oH6qaRhlbu21%.

(Continued)

*Primary Examiner* — Tuan A Tran

(74) *Attorney, Agent, or Firm* — Cramer Patent & Design, PLLC.; Aaron R. Cramer

(57) ABSTRACT

This device presents a tracking system for monitoring humans, animals, and objects, featuring a communication unit with GPS, RF signal transmission, 360-degree video, emergency buttons, and biometric sensors. The system includes a customizable base unit with secure authentication and a remote-control device for administration. It facilitates global connectivity to data and emergency centers, offering a versatile and comprehensive solution for various tracking needs. Designed for ease of use and adaptability, this system ensures enhanced safety and monitoring across multiple user classes with minimal training required.

11 Claims, 3 Drawing Sheets

(56) References Cited

U.S. PATENT DOCUMENTS

| | | | | |
|---|---|---|---|---|
| 9,639,899 | B1 * | 5/2017 | Gersitz | H04W 4/02 |
| 9,675,051 | B2 * | 6/2017 | Bonge, Jr. | A01K 15/023 |
| 9,693,536 | B1 * | 7/2017 | Dana | A01K 15/023 |
| 9,747,770 | B1 * | 8/2017 | Bartlett | G08B 25/016 |
| 10,028,120 | B2 | 7/2018 | Eisenman | |
| 10,136,618 | B2 * | 11/2018 | Bonge, Jr. | G06F 8/65 |
| 10,238,092 | B2 * | 3/2019 | Bonge, Jr. | G16H 40/67 |
| 11,044,889 | B1 * | 6/2021 | Rogers | A01K 11/008 |
| 11,213,010 | B1 * | 1/2022 | Lewis | A01K 11/006 |
| 11,533,582 | B2 * | 12/2022 | Puppala | G01S 5/02 |
| 11,806,601 | B1 * | 11/2023 | Fowler | A63B 71/0669 |
| 11,984,012 | B2 * | 5/2024 | Doxey | H04W 4/02 |
| 12,004,040 | B2 * | 6/2024 | Puppala | G01S 5/0295 |
| 12,133,508 | B2 * | 11/2024 | Bedell | H04N 7/18 |
| 12,167,716 | B2 * | 12/2024 | Smith | A01K 27/001 |
| 2004/0198382 | A1 | 10/2004 | Wong | |
| 2007/0200716 | A1 | 8/2007 | Haase et al. | |
| 2007/0270157 | A1 * | 11/2007 | Kim | H04W 64/00 455/456.1 |
| 2010/0238033 | A1 | 9/2010 | Blumel et al. | |
| 2010/0315241 | A1 * | 12/2010 | Jow | A01K 11/008 340/573.3 |
| 2012/0050532 | A1 | 3/2012 | Rhyins | |
| 2013/0033375 | A1 * | 2/2013 | Doyle | G08B 21/0261 340/501 |
| 2018/0224517 | A1 * | 8/2018 | Ingerson | G01S 19/14 |
| 2019/0025438 | A1 * | 1/2019 | Venkatraman | G01C 21/20 |
| 2020/0107522 | A1 * | 4/2020 | Kersey | G08B 21/0261 |
| 2020/0349560 | A1 * | 11/2020 | Samples | G06Q 10/40 |
| 2022/0309891 | A1 * | 9/2022 | Fass | G08B 21/0269 |
| 2023/0081845 | A1 * | 3/2023 | Martelock | G06F 3/064 711/154 |
| 2023/0280591 | A1 * | 9/2023 | Shin | G06F 3/013 |
| 2024/0164348 | A1 * | 5/2024 | McKee | A01K 29/005 |
| 2025/0106364 | A1 * | 3/2025 | Wexler | G06V 40/174 |

OTHER PUBLICATIONS

GPS Smart Bracelet Anti Lost GPS + LBS + WiFi Elderly Emergency Call Watch. Product Listing [online]. Copyright © 1995-2024 eBay Inc. [retrieved on Mar. 26, 2024]. Retrieved from the Internet: <URL: https://www.ebay.com/itm/295911490934?itmmeta= 01HSY7G73ZXZNF9A86WYSGHCYQ&hash= item44e5b30576:g:ZX4AAOSwAq1k8GMH&itmprp=enc% 3AAQAJAAABILTpVuXYRHwqC24z7Z8Vqzh59zRg02jOVDINJ4OGf/ Py7YJm2BPtjEw5fO6a7ocnVd2xKBS4LTa4INy.

* cited by examiner

160

175

165

170

70

TRACKING BRACELET

RELATED APPLICATIONS

The present device was first described in and is a continuation of U.S. Provisional Application No. 63/454,832, filed Mar. 27, 2023, the entire disclosures of which are incorporated herein by reference.

FIELD OF THE DEVICE

The present device relates to a wearable device that provides tracking capabilities and wirelessly communicates a given location of said bracelet.

BACKGROUND OF THE DEVICE

Those suffering from mental illnesses such as Alzheimer's and dementia are forced to live their life in a confusing fog. The simple act of knowing where one is at, how to return home or to a safe location, or how to even summon help is extremely difficult or perhaps even impossible. Those who care for such individuals are in constant fear of their charges becoming lost and unable to be found. These same problems may exist in one form or another for young children, those who are mentally disabled, those who may suffer from physical disability such as blindness, or virtually anyone who can be subject to personal crime. Accordingly, there is a constant need for a means by which the safety of those who are mentally disabled or virtually anyone can be assured at all times. The development of the tracking device with enhanced features fulfills this need.

SUMMARY OF THE DEVICE

Embodiments of the present disclosure may include a tracking system comprising a communication unit configured to receive a Global Positioning System (GPS) signal and to transmit information via a first radio frequency (RF) signal. Embodiments may also include a radio transmitter configured to communicate with the communication unit and a base unit via a second RF signal.

In some embodiments, the base unit is configured to receive a third RF signal from the radio transmitter and to provide tracking information for at least one of a human user, an animal user, and an inanimate object. Furthermore, the tracking system may be configured to serve different classes of users, including at least a human user wearing the communication unit attached to a bracelet, an animal user wearing the communication unit attached to a collar, and an inanimate object equipped with a disc for tracking purposes. Additionally, the communication unit and the disc may be further configured to issue alerts authorized by an authorized administrator through the base unit.

In some embodiments, the communication unit may include a housing. Embodiments may also include a set of video cameras providing a 360-degree video image, a video screen for two-way video communication, a home button, a duress button, and a medical information button, as well as a set of directional guidance arrows to guide a user to a safe location.

In some embodiments, the communication unit can be attached to the user by a collar or bracelet equipped with an anti-tamper device, which is only removable by an authorized administrator. Additionally, the base unit may include a housing equipped with a touch screen and an authentication means for programming and use authorization, with the touch screen capable of displaying various screen icons for ease of programming and use.

In some embodiments, the tracking system may include a remote-control device connected to the base unit via a first communication link, enabling remote administration and control of the tracking system. The radio transmitter may be configured to facilitate communication linkage between the communication unit, the disc, and the Internet via a second communication link, enabling global access and connectivity.

Furthermore, the system may be configured to allow for the transmission of biometric data via the communication unit, including data from biometric skin sensors, which may be configured to measure at least one of oximetry, pulse, and temperature readings of the user. The system may also be programmable by the authorized administrator to include user-specific information such as physical description, identifying marks, and emergency contact information. Finally, the tracking system may include data centers and emergency response centers connected via auxiliary communication links to the system for data storage, access rights management, and emergency response coordination.

BRIEF DESCRIPTION OF THE DRAWINGS

The advantages and features of the present device will become better understood with reference to the following more detailed description and claims taken in conjunction with the accompanying drawings, in which like elements are identified with like symbols, and in which:

FIG. 5 is a front view of a base unit 70, as used with the tracking system 10, according to the preferred embodiment of the present device.

Figure 1:
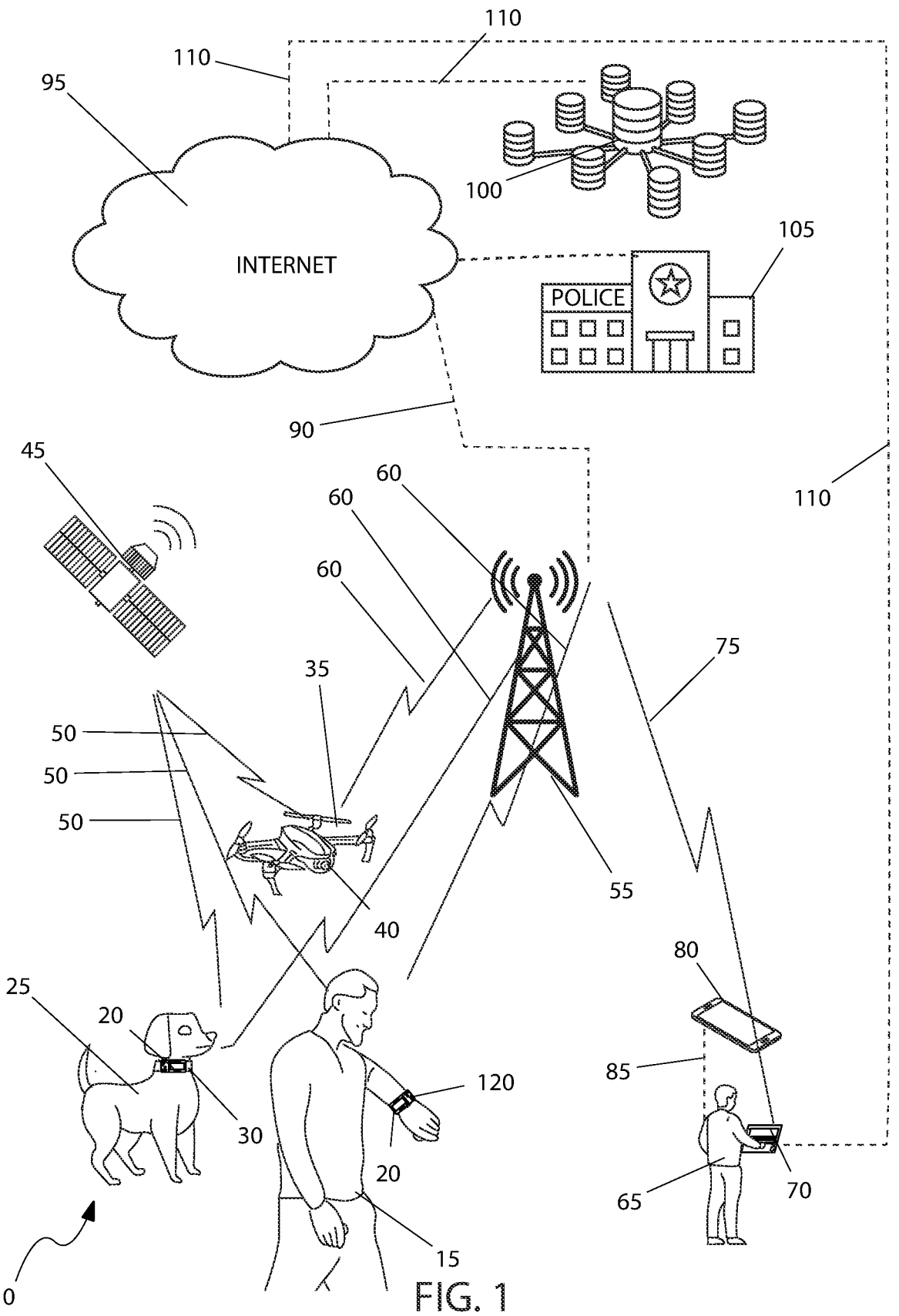
FIG. 1 is a pictorial diagram of the tracking system 10, along with associated interfaces, according to the preferred embodiment of the present device.

DESCRIPTIVE KEY 10 tracking system
15 human user
20 communication unit
25 animal user
30 collar
35 inanimate object
40 disc
45 global position system (GPS)
50 first radio frequency (RF) signal
55 radio transmitter
60 second radio frequency (RF) signal
65 authorized administrator
70 base unit
75 third radio frequency (RF) signal
80 remote control device
85 first communication link
90 second communication link
95 Internet
100 data center 105 emergency response center
110 auxiliary communication link
115 communication unit housing
120 bracelet
125 video camera
130 video screen
135 home button
140 duress button
145 medical information button
150 directional guidance arrow
155 biometric skin sensor
160 base unit housing
165 touch screen
170 authentication means
175 screen icon

1. Description of the Device

The best mode for carrying out the device is presented in terms of its preferred embodiment, herein depicted within FIGS. 1 through 5. However, the device is not limited to the described embodiment, and a person skilled in the art will appreciate that many other embodiments of the device are possible without deviating from the basic concept of the device and that any such work around will also fall under scope of this device. It is envisioned that other styles and configurations of the present device can be easily incorporated into the teachings of the present device, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Figure 4:
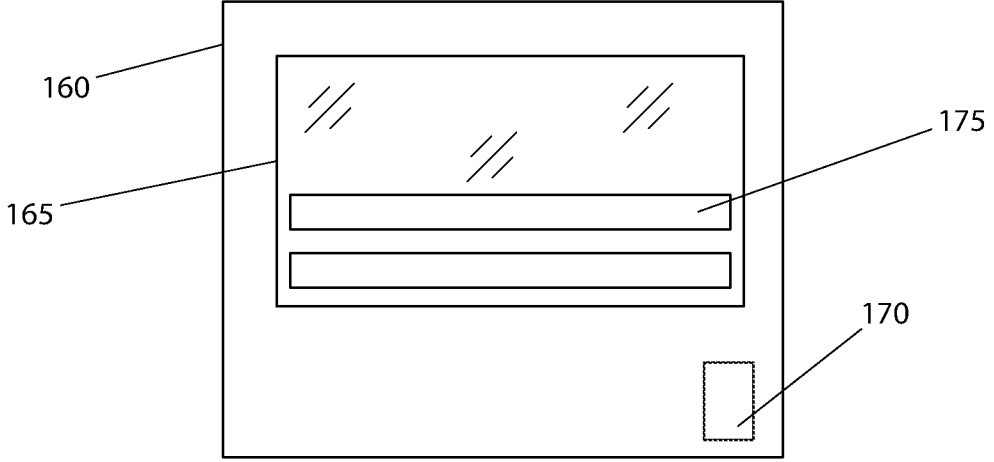
FIG. 4 is a front view of a disc 40, as used with the tracking system 10, according to the preferred embodiment of the present device.
Figure 4:
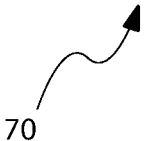

Referring now to FIG. 1, a pictorial view of the tracking system 10, along with associated interfaces, according to the preferred embodiment of the present device is disclosed. The tracking system (herein also described as the "system") 10, provides for a communication unit 20 and associated systems that provides for global position system (GPS) 45 reception and message transmission capabilities. Tracking services are extended to three (3) different classes of users. The first is a human user 15 wearing the communication unit 20 attached to a bracelet 120. The human user 15 may be a human of any age or mental capability, but is most commonly an elderly individual, suffering from a mental disability, a child, and/or someone unable to function on their own for an extended period of time with the assistance of others. The communication unit 20 will be described in greater detail herein below. The second class of user would be an animal user 25 wearing a communication unit 20 attached to a collar 30. The animal user 25 is envisioned to be a pet such as a dog or cat but may also include all types of pets as well as livestock. The third class of user is envisioned to be an inanimate object 35 equipped with a disc 40. The inanimate object 35 is depicted as a drone for illustrative purposes, as an object 35 that can become lost over great distances. However, other inanimate objects 35 including, but not limited to: car keys, eyeglasses, remote controls, wireless phones, or the like. The exact type of inanimate object 35 is not intended to be a limiting factor of the present device. The disc 40 is illustrated in FIG. 4.

A global positioning system (GPS) 45 provides location information to the human user 15 and animal user 25 via the communication unit 20 and the inanimate object 35 via a disc 40 with a first radio frequency (RF) signal 50. Additionally, the communication unit 20 and the disc 40 is in communication with a radio transmitter 55 via multiple second radio frequency (RF) signals 60. The radio transmitter 55 is envisioned to be an intermediate range device such as a cellular data transmitter. However, other types of intermediate range transmitters that provide service over a wide or global area may satisfy the requirements of the radio transmitter 55. As such, the exact type of radio transmitter 55, including frequency, power, data transmission, or the like, may serve equally well, and as such, should not be interpreted as a limiting factor of the present device.

The radio transmitter 55 also provides for the transmission of information to an authorized administrator 65 using a base unit 70 at a fixed location, such as a residence or business, via a third radio frequency (RF) signal 75. The authorized administrator 65 is envisioned to be a responsible person such as a parent, caretaker, owner, or the like who is responsible for the wellbeing of the human user 15, the animal user 25, and/or the inanimate object 35. The base unit 70 allows for tracking of multiple human users 15, animal users 25, and/or inanimate objects 35. Further description of the base unit 70 will be provided herein below. As the functionality afforded by the base unit 70 is only available at a fixed location, remote administration/control of the base unit 70 is afforded by a remote-control device 80, such as a personal electronic device (as shown), a tablet computer, a portable computer, or the like. The exact type of remote-control device 80 is not intended to be a limiting factor of the present device. The remote-control device 80 is connected to the base unit 70 via a first communication link 85 such as a wireless signal (Wi-Fi signal, Bluetooth® signal, cellular signal, RF signal, or the like), or a wired signal such as Ethernet signal. The exact method of transmission utilized by the first communication link 85 is not intended to be a limiting factor of the present device.

To allow for communication linkage between the aforementioned components and systems, a second communication link 90 is provided between the radio transmitter 55 and the Internet 95. The Internet 95 allows for true global wide access to the benefits afforded by the device 10. The Internet 95 is connected to data centers 100, to emergency response centers 105, and the base unit 70 by auxiliary communication links 110, envisioned to be either wired or wireless as described above. The data centers 100 will hold all data associated with usage of the device 10 including but not limited to billing, access rights, storage, administration rights, and the like. The emergency response centers 105 is envisioned to be entities such as additional authorized users, police stations, emergency stations, central stations or the like.

The communication unit 20 and the disc 40 are capable of issuing alerts, as authorized by the authorized administrator 65, through the base unit 70 or the remote control device 80 directly to the base unit 70 and/or the emergency response centers 105, dependent on the capabilities and access granted by the base unit 70 and/or the remote control device 80 via unique identification properties embedded in the second radio frequency (RF) signal 60, the third radio frequency (RF) signals 75, the second communication link 90, and the auxiliary communication links 110. These identification properties are initially setup by the authorized administrator 65 during initial setup (immediate post purchase) or at any later time. The identification properties are envisioned to include, but not be limited to: physical description, identifying marks, photograph, address, telephone numbers, age, name, contact information, and the like, depending on the class of user such as the human user 15, the animal user 25, or the inanimate object 35.

Figures 2, 3:
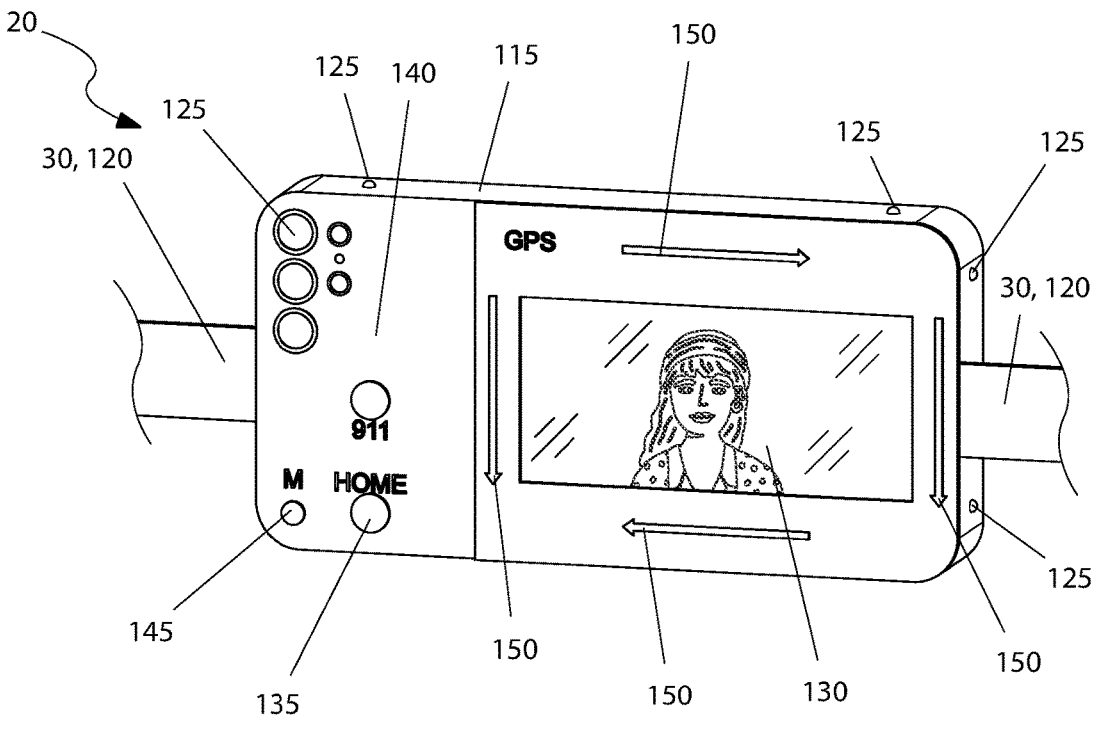
FIG. 2 is a front view of a communication unit 20, as used with the tracking system 10, according to the preferred embodiment of the present device.
FIG. 3 is a rear view of the communication unit 20, as used with the tracking system 10, according to the preferred embodiment of the present device.

Referring next to FIG. 2, a front view of the communication unit 20, as used with the system 10, according to the preferred embodiment of the present device is depicted. The communication unit 20 is depicted as worn upon the wrist of the human user 15 (as shown in FIG. 1), however other variations, such as articles of clothing, jewelry, wrist watch, wrist band, shoes, baby bag, toy, pacifier, earrings, hair bows, hair pin/clip, or the like may also be utilized. It is noted however, that the capabilities may not be available on all of the above-described versions, such as the disc 40.

The communication unit 20 is provided with a communication unit housing 115 and a collar 30 or bracelet 120. The collar or bracelet 120 is provided with an anti-tamper device that only allows the collar 30 or bracelet 120 to be installed and removed by an authorized administrator 65 (as shown in FIG. 1). A set of video cameras 125 provide a three-hundred-sixty-degree (360°) video image for use by the authorized administrator 65 and/or the emergency response centers 105 (as shown in FIG. 1) to determine the physical location and/or potential threats to the human user 15 (as shown in FIG. 1). A video screen 130 provides for two-way video communication of a trusted individual, such as the authorized administrator 65 for the human user 15 such that trust may be formed. A home button 135 may be pressed to summon assistance of the authorized administrator 65. A duress button 140 may be pressed to summon the assistance of the emergency response centers 105. A medical information button 145 allows for playback of pertinent medical information including, but not limited to: the name of the human user 15, ailments, allergies, emergency contact information, telephone numbers and the like. A set of four (4) directional guidance arrows 150 will guide the human user 15 to a safe location such as their residence, an emergency response centers 105, or the like.

Referring now to FIG. 3, a rear view of the communication unit 20, as used with the system 10, according to the preferred embodiment of the present device is shown. The communication unit housing 115 and the collar 30 or bracelet 120 are again depicted as components of the communication unit 20. The rear surface of the communication unit housing 115 is provided with multiple biometric skin sensors 155, such as oximeter sensors, pulse sensors, and temperature sensors. The biometric skin sensors 155 contact the skin of the human user 15 and provide necessary readings as part of the data transmitted by the second radio frequency (RF) signal 60. The biometric readings are then received and interpreted by either the authorized administrator 65 or the emergency response centers 105 (both of which are shown in FIG. 1). Dependent on the configuration of the communication unit 20, said biometric skin sensors 155 may or may not be provided. Should any of the readings be outside of a normal range, the communication unit 20 will activate both the home button 135 and the duress button 140 (both as shown in FIG. 2) to summon assistance.

Referring now to FIG. 5, a front view of the base unit 70, as used with the system 10, according to the preferred embodiment of the present device is disclosed. The base unit 70 is provided in a base unit housing 160 and equipped with a touch screen 165 and an authentication means 170. The touch screen 165 allows for simplicity of use and programming of the device 10 by the authorized administrator 65 (as shown in FIG. 1). The authentication means 170 may be a fingerprint reader, authentication key, facial recognition or the like to ensure that any configuration changes made to the device 10, such as the addition or removal of any communication unit 20 or disc 40 (all of which are shown in FIG. 1) are authorized. The touch screen 165 is capable of producing various screen icons 175 such that programming and usage of the system 10 may be accomplished. The screen icons 175 will change in size, shape, appearance and information provided as is expected of a user interface.

2. Operation of the Preferred Embodiment

The preferred embodiment of the present device can be utilized by the common user in a simple and effortless manner with little or no training. It is envisioned that the system 10 would be constructed in general accordance with FIG. 1 through FIG. 5. The user would procure the system 10 from conventional procurement channels such as electronics retailers, discount stores, department stores, mail order and internet supply houses and the like. Special attention would be paid to the needed features as described above as well as the quantity and type of communication unit 20, collar 30, bracelet 120, and disc 40.

After procurement and prior to utilization, the system 10 would be prepared in the following manner: the authorized administrator 65 would program (or pair) the necessary communication unit 20 and/or disc 40 into the base unit 70 after authorization by the authentication means 170. Various parameters such as physical description, identifying marks, photograph, address, telephone numbers, age, name, contact information, and the like, depending on the class of user such as the human user 15, the animal user 25, or the inanimate object 35, can be manually entered into the communication unit 20. Next, the communication unit 20 would be applied to any or all of the human user 15 via the bracelet 120, to the animal user 25 with the collar 30, and to the inanimate object 35 with the disc 40. At this point in time, the system 10 is ready for utilization.

During utilization of the system 10, the following procedure would be initiated: under normal operating conditions, the communication unit 20 and the disc 40 remain transparent in usage to the human user 15, the animal user 25 and the inanimate object 35 respectively. However, should the various users become lost, undergo duress, or suffer from a medical emergency, the system 10 will provide location information to any authorized administrator 65 via the base unit 70 or a remote-control device 80 via a dedicated app. At this time, the authorized administrator 65, the emergency response centers 105, and/or other entity can provide assistance following normal conventions.

After use of the system 10, it is reset via the base unit 70 or the remote-control device 80, thus allowing for continued use as described above, in a repeating manner.

In a specific embodiment, the advanced tracking system (10) is designed to offer monitoring and safety solutions for human users (15), animal users (25), and inanimate objects (35). Central to the system is the communication unit (20), which can be securely attached to humans via a bracelet (120), to animals via a collar (30), and to objects via a disc (40). This unit is adept at receiving signals from the Global Positioning System (GPS) (45) and transmitting data via a first radio frequency (RF) signal (50). For enhanced connectivity, a radio transmitter (55) facilitates communication between the communication unit (20) and the base unit (70) through a second RF signal (60), while the base unit (70)

itself communicates back to the transmitter using a third RF signal (75). The system's adaptability and control are further enhanced by a remote-control device (80), which connects to the base unit (70) via a first communication link (85), ensuring seamless management even from remote locations. Integration with the internet (95) through a second communication link (90) expands the system's capabilities, enabling global access and connectivity. This connectivity extends to data centers (100) and emergency response centers (105), facilitated by auxiliary communication links (110), ensuring data integrity and swift emergency management. The communication unit (20) is housed in a durable communication unit housing (115) and equipped with a 360-degree video camera (125), a video screen (130) for two-way communication, emergency response buttons including a home button (135), a duress button (140), and a medical information button (145). Additionally, it includes directional guidance arrows (150) for navigation and biometric skin sensors (155) for health monitoring, enhancing user safety and well-being. The base unit (70), the system's command center, is encased in a base unit housing (160) and features a touch screen (165) for user-friendly programming and interaction, supported by an authentication means (170) to ensure secure access and adjustments. Screen icons (175) on the touch screen (165) provide intuitive guidance for programming and using the system, making advanced monitoring accessible to the authorized administrator (65) with minimal training. This embodiment showcases a holistic approach to tracking and safety, incorporating every aspect of the specified technology to deliver a comprehensive and user-centric monitoring solution.

The foregoing descriptions of specific embodiments of the present device have been presented for purposes of illustration and description. They are not intended to be exhaustive or to limit the device to the precise forms disclosed, and obviously many modifications and variations are possible in light of the above teaching. The embodiments were chosen and described in order to best explain the principles of the device and its practical application, to thereby enable others skilled in the art to best utilize the device and various embodiments with various modifications as are suited to the particular use contemplated.

What is claimed is:

1. A tracking system comprising: a communication unit configured to receive a global positioning system (GPS) signal and to transmit information via a first radio frequency (RF) signal; and, a radio transmitter configured to communicate with the communication unit and a base unit via a second RF signal; and, wherein the base unit configured to receive a third RF signal from the radio transmitter and to provide tracking information for at least one of a human user, an animal user, and an inanimate object; wherein the tracking system is configured to serve different classes of users including at least a human user wearing the communication unit attached to a bracelet, an animal user wearing the communication unit attached to a collar, and an inanimate object equipped with a disc for tracking purposes; wherein the communication unit and the disc are further configured to issue alerts authorized by an authorized administrator through the base unit; and wherein the communication unit further comprises: a communication unit housing; a set of video cameras providing a 360-degree video image; a video screen for two-way video communication; a home button, a duress button, and a medical information button; and, a set of directional guidance arrows to guide a user to a safe location.

2. The tracking system of claim 1, wherein the communication unit is attachable to the user by a collar or bracelet equipped with an anti-tamper device, only removable by an authorized administrator.

3. The tracking system of claim 1, wherein the base unit further comprises:

a base unit housing equipped with a touch screen and an authentication means for programming and use authorization; and, wherein the touch screen capable of displaying various screen icons for ease of programming and use.

4. The tracking system of claim 1, further comprising a remote-control device connected to the base unit via a first communication link, enabling remote administration and control of the tracking system.

5. The tracking system of claim 1, wherein the radio transmitter is configured to facilitate communication linkage between the communication unit, the disc, and the Internet via a second communication link, enabling global access and connectivity.

6. The tracking system of claim 1, wherein the system is configured to allow for the transmission of biometric data via the communication unit, including data from biometric skin sensors.

7. The tracking system of claim 6, wherein the biometric skin sensors are configured to measure at least one of oximetry, pulse, and temperature readings of the user.

8. The tracking system of claim 1, wherein the system is configured to be programmable by the authorized administrator to include user-specific information such as physical description, identifying marks, and emergency contact information.

9. The tracking system of claim 1, further comprising data centers and emergency response centers connected via auxiliary communication links to the system for data storage, access rights management, and emergency response coordination.

10. The tracking system of claim 1, wherein the tracking system is configured for ease of use with minimal training, and is programmable for different user classes including human users, animal users, and inanimate objects.

11. The tracking system of claim 1, wherein the tracking system is configured to reset for repeated use after an operation cycle, via the base unit or the remote-control device.

* * * * *